July 26, 1949.
H. CHURCH
2,477,406
CHARGING MAGNESIUM RETORTS
Filed Feb. 9, 1945
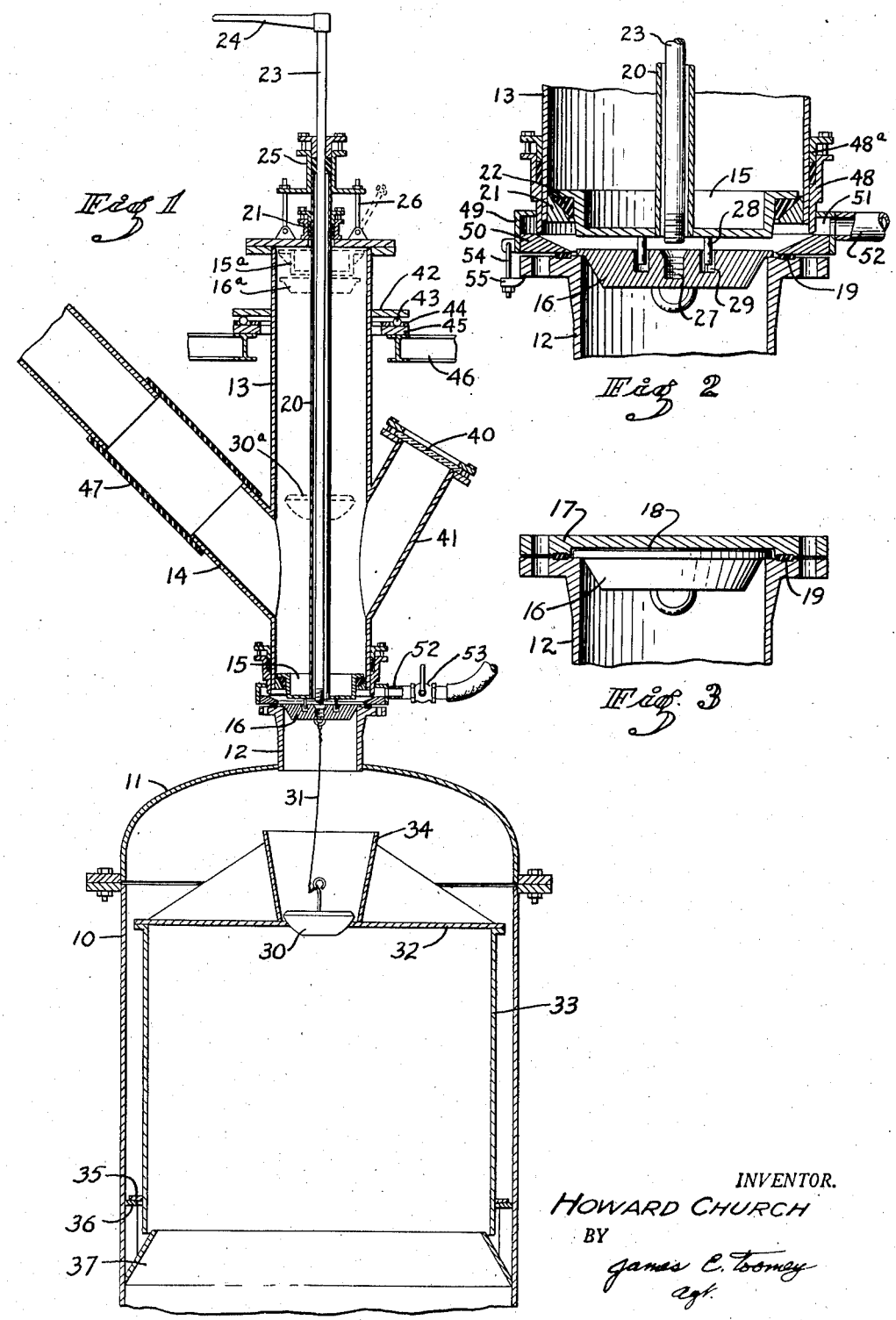
INVENTOR.
HOWARD CHURCH
BY
James E. Toomey
agt.

Patented July 26, 1949

2,477,406

UNITED STATES PATENT OFFICE 2,477,406

CHARGING MAGNESIUM RETORTS

Howard Church, Los Gatos, Calif., assignor, by mesne assignments, to The Permanente Metals Corporation, a corporation of Delaware Application February 9, 1945, Serial No. 576,977

8 Claims. (Cl. 214—35)

The present invention relates to the production of metallic magnesium, and more particularly it relates to means for handling metallic magnesium for subsequent distillation or sublimation to recover solid crystalline deposits thereof.

The furnace product of the carbothermic process for manufacturing metallic magnesium comprises finely divided sub-micron material made up of metallic magnesium which is the product of reaction, carbon and magnesium oxide, and is generally termed "dust." This dust, which is highly pyrophoric, and must therefore be handled in a controlled atmosphere or under protective wetting with a liquid hydrocarbon, is charged to retorts within which it is subjected to high temperature and sub-atmospheric pressure to cause it to sublime. The sublimed metal is recovered in the condenser section of the retort as a solid crystalline mass of metallic magnesium. The wet dust method of charging the retort has generally been favored in the past but this has certain disadvantages in that additional time and heat are required to remove the protective coating of hydrocarbon oil before sublimation of the magnesium dust may take place and after the oil has been removed, a coked residue remains which offers resistance to the subsequently evolved magnesium vapors and gives rise to various mechanical difficulties.

The desirability of charging the retorts with the dust in dry form has long been recognized, but due to the very low bulk density of the dust it has been considered necessary to reduce its bulk by the formation of compact pellets in order to permit a charge of sufficient size for practical operation to be placed in the retort. Charging of the retort with dust without first forming it into pellets would also result in much of the dust being drawn into the vacuum system by which the reduced pressure within the retort is maintained.

Recently a method and apparatus for the formation of pellets of dry magnesium dust has been perfected. A description of the specific steps of this method is not necessary to an understanding of the present invention though it should be known that, before, during and after the formation of the pellets the dust and the completed pellets are protected by an atmosphere of a gas in which magnesium is inert. In other words the dust and the pellets formed therefrom are at all times contained within a gas tight enclosure containing natural gas, hydogen, or other inert atmosphere, to the exclusion of air with which the magnesium would react.

One form of retort which is in use for subliming and condensing magnesium for its recovery in solid metallic form, comprises a pressure tight container usually in the form of a vertical metal cylinder or "bottle." The lower end of this bottle comprises the charge-containing section while the upper end comprises the condensing section. The top of the bottle includes a removable closure through which its contents are charged and discharged, and when charged and sealed the greater part of the bottle is lowered into a pressure tight chamber which contains means for heating its charge-containing section.

It is the charging of the bottle, that is the removable portion of the retort, with which the present invention is particularly concerned. As the dry pelleted magnesium dust is highly pyrophoric in air it is found desirable to purge the bottle with an inert gas prior to the introduction of the charge of pellets. A connection must then be made between the bottle and the vessel or conduit which contains a supply of the pellets and such connection must be established and maintained during the charging operation, and then broken and the bottle closed all without admission of air either to the bottle or to the vessel which contains the pellets which are also under protection of an inert atmosphere.

It is an object of the present invention to provide a simple, safe and effective method and apparatus for charging retorts or other receptacles with dry pelleted magnesium or material having similar characteristics.

A further object of the invention is the provision of a method and apparatus for transferring a material from a controlled atmosphere in one vessel to a similar atmosphere in another and portable vessel without contamination of the atmosphere in either of the vessels.

Further, and more particular objects of the invention and its specific advantages are made apparent in the following specification wherein reference is made to the accompanying drawings which illustrate one form of the apparatus of the invention.

In the drawings;

Figure 1 is a vertical sectional view of an apparatus embodying the present invention illustrating the same in position on a retort bottle, Figure 2 is an enlarged section of a portion of the mechanism shown in Figure 1, and Figure 3 is an enlarged sectional view of the upper end of the retort bottle showing a permanent closure in place thereon.

In Figure 1 of the drawings the upper end of the bottle to be charged with pellets is shown at 10. This upper end of the bottle is closed by a removable dome 11 which is removed only for the purpose of providing access to the condenser and certain portions of the retort below the condenser which are removed, cleaned and reconditioned after each batch operation. The dome 11 is secured in place prior to purging the bottle and charging it with pelleted magnesium and the charge is introduced through a relatively narrow neck 12 disposed centrally at the top of the dome. When the bottle is to be charged it is brought into place under a vertically disposed tubular casing or atmosphere lock 13, and is connected to the lower end thereof so that the magnesium pellets may be discharged through a conduit at 14 which enters the atmosphere lock at a downwardly inclined angle and communicates at its upper end with a pellet storage bin (not shown) or other source of supply.

The lower end of the atmosphere lock 13 is normally sealed against admission of air by a valve 15 and the top of the bottle is closed by a valve plate 16. The valve plate 16 is in effect a temporary seal which functions only when a more permanent seal is removed from the bottle top prior to connecting it to the atmosphere lock. The more permanent seal referred to is shown in Figure 3 as a blind flange 17 which may be bolted to the bottle top in a conventional manner and which is recessed on its under surface, and as is indicated at 18, provides clearance for that portion of the valve plate 16 which projects above the top of the bottle neck. Provision is also made in the blind flange 17 and the top flange of the bottle neck for the reception of an annular gasket 19 which remains in place in the bottle neck when the flange 17 is removed.

When the bottle is to be charged it is first purged of air by the introduction of an inert gas through a suitable valve opening (not shown) and then moved into position under the atmosphere lock 13. The blind flange 17 is then removed from the bottle and a gas-tight connection is made between the top of the bottle and the lower end of the atmosphere lock by means, presently to be described in detail, which brings the parts into the relative positions illustrated in Figure 1.

It is then necessary, in order that pellets feeding through the conduit 14 will gravitate into the bottle, to open valve 15, and also to remove the valve plate 16. The valve 15 has a tubular stem 20 permanently secured to it and extended upwardly through the top of the atmosphere lock through which it passes by means of a packing gland 21 enabling it to slide in a vertical direction without admitting air to the interior of the lock. The connection of the valve 15 is best illustrated in Figure 2 wherein it is shown as carrying a seat member 22 of rubber or other resilient material cooperating with a metal seat 21 which is annular in shape and fixed to the interior of the lower end of the lock 13. The valve plate 16 is also controlled by a vertically disposed stem 23 which is disposed concentrically within the tubular stem 20 and projects through a gas-tight gland 25 carried by and fixed to the upper end of the tubular stem 20. The gland 25 and the tubular stem 20 by which it is carried are normally held against vertical movement by swing bolts 26 which may be released and swung to dotted line position to permit the stem to rise vertically. The lower end of the valve stem 23 is removably connected with the valve plate 16 through the medium of a threaded socket 27 in the valve plate. A pair of pins 28 carried by the valve 15 depend downwardly into registering bores 29 in the valve plate 16 to hold it against rotation while the stem 23 is manipulated to make or break its connection with the valve plate. Through the mechanism just described both valves may be opened after a gastight connection has been made between the atmosphere lock and the retort bottle. This is accomplished first by screwing the valve stem 23 into the valve plate 16 by manipulation of the handle 24. After this connection has been established the swing bolts 26 are released and the valve stem 23 is lifted carrying with it the valve plate 16, the valve 15 and the tubular stem 20 which slides vertically through the gland 21 until the valves occupy the dotted line positions illustrated at 15a and 16a in the uppermost portion of the atmosphere lock. A plug valve 30 in the condenser portion of the retort is also raised into the atmosphere lock to occupy the dotted line position indicated at 30a through its connection with the valve plate 16 by a cord or wire 31. The wire 31 is of sufficient strength to raise the plug valve 30 under ordinary circumstances but, after sublimation, the plug valve sometimes becomes frozen to its seat by the accumulation of magnesium crystals, and the wire 31 is designed therefore to part or give way when the dome 11 is removed, to permit removal of the condenser sleeve from the retort bottle for recovery of the metal condensed thereon.

The plug valve 30 sits in an opening disposed centrally of a top plate 32 which covers the upper end of a condenser sleeve 33 removably disposed in the upper end of the retort 10. Surrounding the opening which is normally closed by the valve 30, is a funnel shaped charging tube 34 which receives the charge as it enters through the neck 12 and directs it downwardly into the lower portion of the retort bottle wherein is contained any conventional structure (not shown) for holding the charge during the retorting operation. A suitable structure for this purpose is shown, for example, by the patent Hansgirg 2,309,644, dated February 2, 1943. The removable condensing sleeve 33 may also be of any conventional design, the one herein shown for purposes of illustration being supported in the retort bottle by an annular flange 35 circumscribing its lower end and resting on an internal annular flange 36 secured to the inner wall of the bottle. A baffle 37 is preferably arranged within the bottle just below the condenser sleeve and extends to a position just beyond the interior surface of the condenser sleeve and thereby prevents a metallic deposit between the sleeve and the retort, which deposit would tend to hinder the removal of the sleeve at the completion of the retorting operation.

After the pellets have been introduced to the bottle through the conduit 14 where their flow is controlled by suitable valve means (not shown) the plug valve 30, the valve plate 16 and the valve 15 are again lowered to the positions illustrated in Figure 1. The swing bolts 26 are replaced to hold the valve stem 20 and the valve 15 in place and the valve stem 23 is disconnected from the valve plate 16. Thus both the interior of the bottle 10 and the interior of the atmosphere lock 13 have been sealed against the admission of air and the bottle may be removed and its permanent closure plate 17 replaced in Figure 3. The proper registration of the valves and their seats may be observed during this operation through a window 40 arranged in a tube 41 which communicates with the interior of the atmosphere lock at a suitable angle to permit convenient observation.

The retort bottles are very large and unwieldly to handle particularly in establishing the connection with the charging apparatus above described. For example, in a typical retort the bottle is made of steel and is approximately 5 feet in diameter and has an overall length of about 20 feet. It accommodates a charge of pellets weighing about 5 tons. Consequently, while the bottle may be lifted by a crane into position on a turn table adapted to bring it under the charging apparatus, its adjustment to a position of exact registration with the charging apparatus, which is necessary to establish a gas-tight connection, would be very difficult. The present invention therefore contemplates a mounting for the charging apparatus which permits it to be adjusted within reasonable limits to facilitate a perfect connection. To this end, atmosphere lock 13 is supported by a flange 42 which rests on ball bearings 43 which are in turn arranged in a retainer ring 44 supported by a bearing plate 45. The bearing plate 45 is supported on structural members which in actual practice may be the supporting beams 46 of a floor or platform provided for convenient access to the upper portion of the apparatus. This ball bearing support permits limited rotary and horizontal adjustment of the apparatus, and the conduit 14 which connects the atmosphere lock with the storage bin, or the like, may include a section 47 of rubber tube or other flexible connecting means to permit the desired relative movement.

At its lower end the atmosphere lock is provided with means which is vertically adjustable in making the connection with the retort bottle. This means is best illustrated in Figure 2 of the drawings and comprises a collar 48 vertically slidable on the tubular member 13 and sealed with respect thereto by a packing gland 48a. The lower end of the collar 48 carries an outwardly and downwardly depending flange 49 which supports a flange 50 which cooperates with the top flange of the retort bottle and the gasket thereon to provide a gas-tight seal. The flanges 49 and 50 are also arranged to provide an annular chamber 51 for the distribution of a sweeping gas which may be admitted through a conduit 52 under control of a valve 53. Just prior to the seating of the lower end of the atmosphere lock on to the top of the bottle the valve 53 can be opened to sweep out with an inert gas any air that may remain between the parts which are to be clamped together. The top face of the flange 50 is inwardly and downwardly inclined and spaced slightly below the bottom edge of the collar 48 to provide a slit opening circumscribing the seat of the valve plate 16. Through this means the valve seat may be swept clean of dust or particles of pellets just before the valve is lowered into place by the admission of a short blast of neutral gas through the valve 53. As all of the mechanism just described is supported by the vertically adjustable collar 48 the flange 50 may be brought into its gas-tight or sealing position with relation to the top of the retort bottle itself. This vertical sliding connection adjacent the seal between bottle and the charging is also desirable, as in some cases the bottle is supported on a weighing scale as a means of measuring its charge. Any slight lowering of the bottle due to the operation of the scale or failure of the supporting means will therefore be accommodated by the slidable mounting of the connecting means.

It is, of course, desirable that some pressure be applied in establishing the gas-tight seal between the bottle and the charging apparatus, and in order to apply such pressure and also to prevent accidents and breaking of the seal during the operation, any suitable clamping means may be employed. A simple means which may be used for this purpose is illustrated in Figure 2 as a series of swing bolts on which is shown at 54 as depending from a pivotal connection on the flange 50 and having a threaded nut on its lower end for raising a lug 55 against the lower edge of the flange at the top of the bottle.

I claim:

1. Apparatus for charging material to a retort bottle or the like while maintaining the material under a controlled atmosphere which comprises a vertically disposed atmosphere lock adapted to be sealed at its lower end to the neck of the bottle, a valve normally closing the lower end of the lock, a valve normally closing the bottle, and means for raising both of said valves into the upper end of the lock whereby material admitted to the lower end of the lock will pass into the bottle.

2. Apparatus for charging material to a retort bottle or the like while maintaining the material under a controlled atmosphere which comprises a vertically disposed atmosphere lock adapted to be sealed at its lower end to the neck of the bottle, a valve normally closing the lower end of the lock, a valve normally closing the bottle, a hollow stem on the lock valve passing through the top of the lock, a stem for the bottle valve extending through the hollow stem and adapted to be connected to the valve whereby both valves may be raised into the lock, and means for feeding material through the opened valves.

3. In a bottle charging apparatus of the character described, an atmosphere lock adapted to be connected with the neck of a bottle, a valve closing the bottom of the lock, a valve closing the neck of the bottle, concentric stems one connected to the lock valve and the other adapted to be connected with the bottle valve and both extending through the top of the lock whereby the valves may be raised in the lock after it is connected with the bottle.

4. In a bottle charging apparatus of the character described, an atmosphere lock adapted to be connected with the neck of a bottle, a valve closing the bottom of the lock, a valve closing the neck of the bottle, concentric stems one connected to the lock valve and the other adapted to be connected with the bottle valve and both extending through the top of the lock whereby the valves may be raised in the lock after it is connected with the bottle, and a packing gland between the outer stem and the top of the lock, a packing gland between the inner stem and the outer stem, and means releasably connecting the latter gland to the top of the lock.

5. Apparatus for charging material to a retort bottle and for maintaining the material under controlled atmosphere which comprises an atmosphere lock, means for connecting said lock with the top of a bottle to be charged, a valve plate in the top of the bottle, a valve in the lock adapted to overlie said valve plate, a connection between the valve and valve plate preventing relative rotation, a hollow stem on the valve extending to the exterior of the atmosphere lock, a rotatable stem extending through said hollow stem and adapted to be connected with said valve plate by rotary movement whereby the valve and valve plate may be lifted from their seats, and means for charging material to the bottle through said atmosphere lock while the valves are open.

6. Apparatus for charging material under a controlled atmosphere to a retort bottle which contains a condenser in its upper end with a plugged opening through which the material is charged to its lower portion, said apparatus comprising, an atmosphere lock adapted to be connected with the bottle neck, a gas seal at the top of the bottle, a gas seal in the atmosphere lock, means operable from the exterior of the atmosphere lock for raising both said seals and said condenser plug upwardly into the lock, and means for charging material to the bottle through the lower end of the lock while the seals and plug are held in their raised position.

7. Apparatus for charging material under a controlled atmosphere to a retort bottle which comprises, an atmosphere lock, a seal closing the lower end thereof, a seal closing the top of the bottle, means for connecting the lower end of the lock with the top of the bottle, means operable from the exterior of the lock for lifting both said seals into the lock to admit material to the bottle through the lower portion of the lock, and means for returning said seals.

8. Apparatus for charging material under a controlled atmosphere to a retort bottle which comprises, an atmosphere lock, a seal closing the lower end thereof, a seal closing the top of the bottle, means for connecting the lower end of the lock with the top of the bottle, means operable from the exterior of the lock for lifting both said seals into the lock to admit material to the bottle through the lower portion of the lock, means for returning said seals, and means for directing an inert sweeping gas over the seat of the bottle seal before it is returned to remove material deposited thereon.

HOWARD CHURCH.

REFERENCES CITED

The following references are of record in the file of this patent:

UNITED STATES PATENTS

| Number | Name | Date |
|---|---|---|
| 522,705 | Chandler | July 10, 1894 |
| 959,488 | Emerson | May 31, 1910 |
| 994,550 | Williams et al. | June 6, 1911 |
| 1,376,458 | Newth | May 3, 1921 |
| 1,714,075 | Carvalho | May 21, 1929 |
| 2,138,356 | Ryan | Nov. 29, 1938 |
| 2,248,868 | Hanawalt | July 8, 1941 |
| 2,362,718 | Pidgeon | Nov. 14, 1944 |
| 2,367,393 | Green | Jan. 16, 1945 |

FOREIGN PATENTS

| Number | Country | Date |
|---|---|---|
| 662,205 | Germany | July 7, 1938 |
| 415,074 | Germany | June 15, 1925 |